United States Patent
Yoon et al.

(10) Patent No.: US 8,802,322 B2
(45) Date of Patent: Aug. 12, 2014

(54) INTERCONNECT-TYPE SOLID OXIDE FUEL CELL AND FUEL CELL STACK HAVING THE SAME

(75) Inventors: Duk-Hyoung Yoon, Yongin-si (KR); Sang-Jun Kong, Yongin-si (KR); Tae-Ho Kwon, Yongin-si (KR); Kwang-Jin Park, Yongin-si (KR); Gyu-Jong Bae, Yongin-si (KR); Hyun Soh, Yongin-si (KR); Young-Sun Kwon, Yongin-si (KR)

(73) Assignee: Samsung SDI Co., Ltd. (KR)

( * ) Notice: Subject to any disclaimer, the term of this patent is extended or adjusted under 35 U.S.C. 154(b) by 174 days.

(21) Appl. No.: 13/586,786

(22) Filed: Aug. 15, 2012

(65) Prior Publication Data

US 2013/0216930 A1 Aug. 22, 2013

(30) Foreign Application Priority Data

Feb. 17, 2012 (KR) .................. 10-2012-0016441

(51) Int. Cl.
*H01M 8/10* (2006.01)
*H01M 8/00* (2006.01)
*H01M 8/12* (2006.01)

(52) U.S. Cl.
CPC ............ *H01M 8/004* (2013.01); *H01M 8/1206* (2013.01); *H01M 8/10* (2013.01)
USPC ........... 429/497; 429/466; 429/468; 429/479; 429/517

(58) Field of Classification Search
CPC ...... H01M 8/004; H01M 8/1206; H01M 8/10
USPC .................. 429/466, 468, 479, 490, 497, 517
See application file for complete search history.

(56) References Cited

U.S. PATENT DOCUMENTS

| | | | |
|---|---|---|---|
| 2005/0147857 A1* | 7/2005 | Crumm et al. | ............. 429/31 |
| 2007/0141447 A1 | 6/2007 | Crumm et al. | |
| 2011/0177431 A1 | 7/2011 | Suh et al. | |

FOREIGN PATENT DOCUMENTS

JP 2011-076996 A 4/2011

* cited by examiner

*Primary Examiner* — Ula C Ruddock
*Assistant Examiner* — Scott J Chmielecki
(74) *Attorney, Agent, or Firm* — Knobbe, Martens, Olson & Bear LLP

(57) ABSTRACT

An interconnecting-type solid oxide fuel cell is disclosed. The fuel cell includes a unit cell, a first current collecting member, a first insulating member, and a second current collecting member. The unit cell has a first electrode layer, an electrolyte layer, and a second electrode layer sequentially formed from an inside thereof, and has an interconnector configured for electrical connection to the first electrode layer and exposed to an outside thereof in a state in which the interconnector is insulated from the second electrode layer. The first current collecting member is formed on an outside of the interconnector and configured to collect current. The first insulating member is formed on an outside of the first current collecting member. The second current collecting member is wound around an outer circumferential surface of the second electrode layer and an outside of the first insulating member.

17 Claims, 7 Drawing Sheets

INTERCONNECT-TYPE SOLID OXIDE FUEL CELL AND FUEL CELL STACK HAVING THE SAME

CROSS-REFERENCE TO RELATED APPLICATIONS

This application claims priority to and the benefit of Korean Patent Application No. 10-2012-0016441, filed on Feb. 17, 2012, in the Korean Intellectual Property Office, the entire content of which is incorporated herein by reference.

BACKGROUND

1. Field

The present disclosure relates to an interconnecting-type solid oxide fuel cell, and more particularly, to an interconnecting-type solid oxide fuel cell having an efficient current collecting structure and a fuel cell stack having the same.

2. Description of the Related Technology

Fuel cells may be classified according to type of electrolyte. Since the fuel cells have various power ranges, usages and the like, a suitable fuel cell can be selected according to its intended purpose. In solid oxide fuel cells, it is relatively easy to control the position of an electrolyte, and there is limited risk of exhausting the electrolyte because of its fixed position. Further, since the solid oxide fuel cells resist corrosion, solid oxide fuel cells have a relatively longer lifetime. For these reasons, the solid oxide fuel cells have come into the spotlight as fuel cells widely used in commerce and domestic use.

Meanwhile, the voltage of a unit cell used in a solid oxide fuel cell may not be as high as compared with that required in a practical use. Therefore, to obtain a required voltage, the rated voltage and capacity of the fuel cell may be designed by electrically connecting a plurality of unit cells in series or in parallel.

When a conventional stack is manufactured using anode-supported tubular-type unit cells, current collection is performed using Ni foam, and the unit cells are electrically connected to one another. However, since gas supplied to the stack should pass through a porous medium, fuel cannot be efficiently supplied to the stack when the unit cells have a relatively longer length. Since the current collection is performed using the porous Ni foam, a current collector does not contact with the unit cell surface, but may merely contact the cell via an electrical wire. Accordingly, the current collection efficiency of the current collector is decreased. Therefore, the performance of the stack may be degraded due to a failure in the supply of gas and/or an increase in current collecting resistance.

SUMMARY OF CERTAIN INVENTIVE ASPECTS

In one aspect, a structure of an interconnecting-type solid oxide fuel cell stack is disclosed. The structure may be configured to ensure a smooth supply of gas and high-efficiency current collection while maintaining advantages of interconnecting-type solid oxide fuel cells.

In another aspect, a current collecting means is provided. The current collecting means may be configured to effectively perform cathode current collection in an interconnecting-type solid oxide fuel cell.

In another aspect, a current collecting structure is provided. The structure may be formed having a plurality of current paths in one unit cell and be configured for dispersively collecting current.

In another aspect, an interconnecting-type solid oxide fuel cell includes, for example, a unit cell, a first current collecting member, a first insulating member, and a second current collecting member.

In some embodiments, the unit cell has a first electrode layer, an electrolyte layer and a second electrode layer sequentially formed from an inside thereof, and has an interconnector configured for electrical connection to the first electrode layer and exposed to an outside thereof in a state in which the interconnector is insulated from the second electrode layer. In some embodiments, the first current collecting member is formed on an outside of the interconnector and configured to collect current. In some embodiments, the first insulating member is formed on an outside of the first current collecting member. In some embodiments, the second current collecting member is wound around an outer circumferential surface of the second electrode layer and an outside of the first insulating member. In some embodiments, the unit cell may be formed as an anode-supported unit cell in which the first electrode layer is an anode and the second electrode layer is a cathode. In some embodiments, a conductive mesh member may be formed on an outer circumferential surface of the second electrode layer. In some embodiments, the second current collecting member may be formed of a heat resistant alloy including iron (Fe) and may include either chrome (Cr) or nickel (Ni). In some embodiments, the solid oxide fuel cell may further include a third current collecting member interposed between the outer circumferential surface of the second electrode layer and the second current collecting member configured to collect current. In some embodiments, radially extending first connecting portions may be formed at ends of the first current collecting member. In some embodiments, radially extending second connecting portions may be formed at ends of the third current collecting member. In some embodiments, the first current collecting member, the first insulating member and the second current collecting member may be provided as a plurality of sets along the length direction of a single unit cell.

In another aspect, an interconnecting-type solid oxide fuel cell stack may include, for example, a plurality of unit cells, a first current collecting member, a first insulating member, a second current collecting member, and a third current collecting member.

In some embodiments, each of the plurality of unit cells has a first electrode layer, an electrolyte layer and a second electrode layer sequentially formed from an inside thereof, and has an interconnector configured for electrical connection to the first electrode layer and exposed to an outside thereof in a state in which the interconnector is insulated from the second electrode layer. In some embodiments, the first current collecting member is formed on an outside of the interconnector and configured to collect current. In some embodiments, radially extending first connecting portions are formed at ends of the first current collecting member. In some embodiments, the first insulating member is formed on an outside of the first current collecting member. In some embodiments, the second current collecting member is wound around an outer circumferential surface of the second electrode layer and an outside of the first insulating member. In some embodiments, the third current collecting member is interposed between the outer circumferential surface of the second electrode layer and the second current collecting member and configured to collect current, and radially extending second connecting portions are formed at ends of the third current collecting member. In some embodiments, the first and second connecting portions are bent to be parallel with the first and third current collecting members, respectively, and the first and second connecting portions are configured for electrical connection to each other. In some embodiments, a second insulating member may be interposed between the first connecting portion and the first current collecting member. In some embodiments, a connecting plate may be interposed between the first and second connecting portions. In some embodiments, the connecting plate may be formed of silver (Ag) epoxy. In some embodiments, at least one mechanical coupling structure of a bolt and nut coupling structure and a rivet coupling structure may be formed between the first connecting portion and the connecting plate and between the connecting plate and the second connecting portion. In some embodiments, a plurality of second connecting members may be configured for electrical connection to one surface of the connecting plate, and a plurality of first connecting portions may be configured for electrical connection to the other surface of the connecting plate.

In another aspect, an interconnecting-type solid oxide fuel cell stack includes, for example, a plurality of unit cells, a first current collecting member, a first insulating member, a second current collecting member, and a third current collecting member.

In some embodiments, each of the plurality of unit cells has a first electrode layer, an electrolyte layer and a second electrode layer sequentially formed from an inside thereof, and has an interconnector configured for electrical connection to the first electrode layer and exposed to an outside thereof in a state in which the interconnector is insulated from the second electrode layer. In some embodiments, the first current collecting member is formed on an outside of the interconnector so as to collect current. In some embodiments, radially extending first connecting portions are formed at ends of the first current collecting member. In some embodiments, the first insulating member is formed on an outside of the first current collecting member. In some embodiments, the second current collecting member is wound around an outer circumferential surface of the second electrode layer and an outside of the first insulating member. In some embodiments, the third current collecting member is interposed between the outer circumferential surface of the second electrode layer and the second current collecting member and configured to collect current. In some embodiments, radially extending second connecting portions are formed at ends of the third current collecting member. In some embodiments, a third insulating member is provided between the second current collecting member formed on any one of the plurality of unit cells and the second current collecting member formed on another unit cell adjacent to the one unit cell, and the first and second connecting portions are configured for electrical connection to each other. In some embodiments, a support body for maintaining an interval between both adjacent second current collecting members and maintaining the shape of the third insulating member may be formed on the inside of the third insulating member. In some embodiments, the support body may be formed of a metal material.

In another aspect, when unit cells are connected in series or parallel, a connection length between current collecting members is relatively short to reduce power loss caused by the current collecting members.

In another aspect, a connection structure between unit cells is simplified to improve current collection efficiency of the unit cells in a stack.

In some embodiments, it is possible to increase a contact area between the unit cell and the current collecting member wound around the unit cell while maintaining advantages of the interconnecting-type unit cell. In some embodiments, since a member or material such as nickel foam for fixing the stack is not separately required, gas can be smoothly supplied.

BRIEF DESCRIPTION OF THE DRAWINGS

Features of the present disclosure will become more fully apparent from the following description and appended claims, taken in conjunction with the accompanying drawings. It will be understood these drawings depict only certain embodiments in accordance with the disclosure and, therefore, are not to be considered limiting of its scope; the disclosure will be described with additional specificity and detail through use of the accompanying drawings. An apparatus, system or method according to some of the described embodiments can have several aspects, no single one of which necessarily is solely responsible for the desirable attributes of the apparatus, system or method. After considering this discussion, and particularly after reading the section entitled "Detailed Description of Certain Inventive Embodiments" one will understand how illustrated features serve to explain certain principles of the present disclosure.

DETAILED DESCRIPTION OF CERTAIN INVENTIVE EMBODIMENTS

Figure 1:
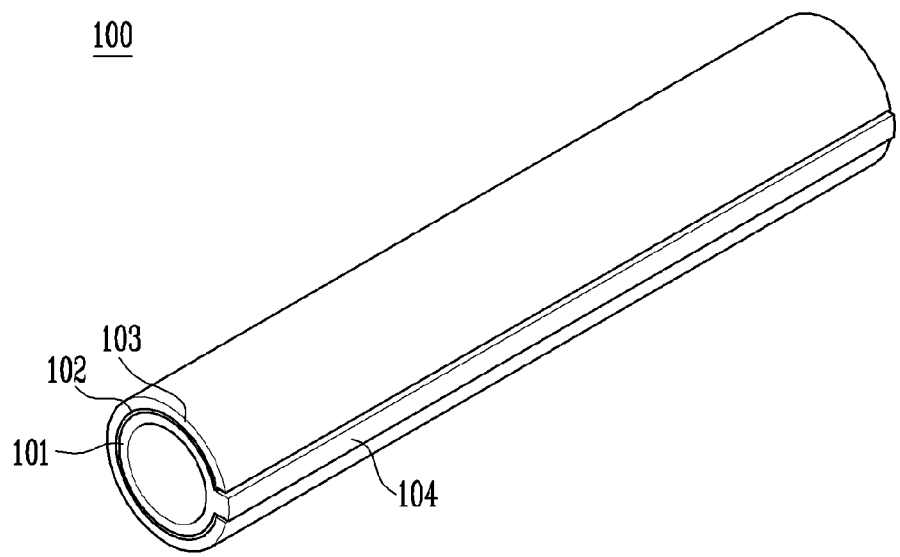
FIG. 1 is a perspective view of an interconnecting-type unit cell.

In the following detailed description, only certain exemplary embodiments of the present invention have been shown and described, simply by way of illustration. As those skilled in the art would realize, the described embodiments may be modified in various different ways, all without departing from the spirit or scope of the invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements. In the drawings, the thickness or size of layers are exaggerated for clarity and not necessarily drawn to scale.

A general fuel cell may include a fuel converter (a reformer and a reactor) configured for reforming and supplying fuel and a fuel cell module. Here, the fuel cell module refers to an assembly including a fuel cell stack configured for converting chemical energy into electric energy and thermal energy using an electrochemical method. That is, the fuel cell module includes a fuel cell stack, a piping system through which fuel, oxide, coolant and emission through a wire which electricity produced by the stack may move, a portion configured for controlling or monitoring the stack, and a portion configured for taking measures when an abnormal state of the stack occurs. An aspect of the present disclosure relates to a current collecting structure of an interconnecting-type fuel cell a stack. Hereinafter, embodiments of the present disclosure will be described in detail.

A unit cell will be described with reference to FIG. 1. FIG. 1 is a perspective view showing an example of an interconnecting-type unit cell. The unit cell 100 is a component configured to receive reformed fuel from a fuel converter (not shown) so as to produce electricity through an oxidation reaction. In the unit cell 100, a first electrode layer 101, an electrolyte layer 102, and a second electrode layer 103 are laminated radially from a central axis thereof. An interconnector 104 is formed to be exposed to an outside of the unit cell 100 in the state that the interconnector 104 may be electrically connected to the first electrode layer 101. In this instance, the interconnector 104 may be insulated from the second electrode layer 103 in such a manner that the interconnector 104 has an insulating material provided between the interconnector 104 and the second electrode layer 103 or is spatially spaced apart from the second electrode layer 103. That is, the unit cell according to this embodiment may be formed as an interconnector type depending upon its method for current collection. The unit cell may also be formed in a tubular shape. However, the unit cell may also be formed in a flat-tubular shape. Here, the flat-tubular shape means a flat-tubular shape having a major diameter and a minor diameter.

The unit cell 100 may be formed as an anode-supported unit cell or cathode-supported unit cell as occasion demands. The unit cell according to the present disclosure may be formed as an anode-supported unit cell or cathode-supported unit cell, and the present disclosure is not limited thereto. That is, the first and second electrode layers 101 and 103 may be formed as an anode and a cathode, respectively. On the other hand, the first and second electrode layers 101 and 103 may be formed as a cathode and an anode, respectively. Hereinafter, the anode-supported unit cell of which first and second electrode layers 101 and 103 are an anode and a cathode, respectively, will be described for convenience of illustration. Meanwhile, when the second electrode layer 103 is a cathode, the electrical conductivity of the second electrode layer 103 is lowered, and hence a metal mesh may be formed on the outside of the second electrode layer 103.

Figure 2:
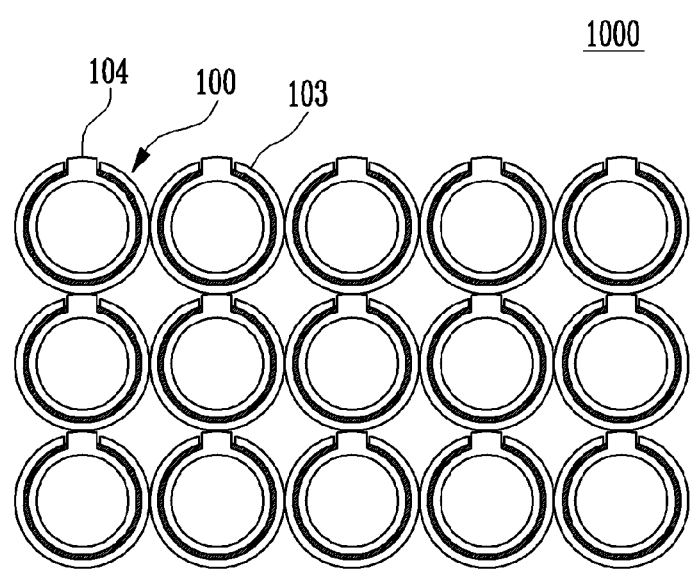
FIG. 2 is a schematic view showing an example in which a plurality of interconnecting-type unit cells is electrically connected to one another.

A state in which unit cells described above are electrically connected will be described with reference to FIG. 2. FIG. 2 is a schematic view showing an example in which interconnecting-type unit cells are configured for electrical connection to one another. As shown in FIG. 2, the cell array may be formed by connecting the unit cells 100 in series and/or in parallel. During operation of the unit cell 100, the interconnector 104 serves as a first electrode, and the second electrode layer 103 exposed to an outer circumferential surface of the unit cell 100 serves as a second electrode. Thus, when the unit cells 100 are connected in series, the unit cells 100 are electrically connected so that the interconnector 104 of one unit cell 100 contacts the second electrode layer 103 of another unit cell 100. On the other hand, when the unit cells 100 are connected in parallel, the unit cells 100 are connected so that the second electrode layers 103 of two unit cells 100 electrically connected to each other also contact each other. FIG. 2 shows a cell array 10 in which the unit cells 100 are connected in 3S5P (3 series 5 parallel).

Figure 3:
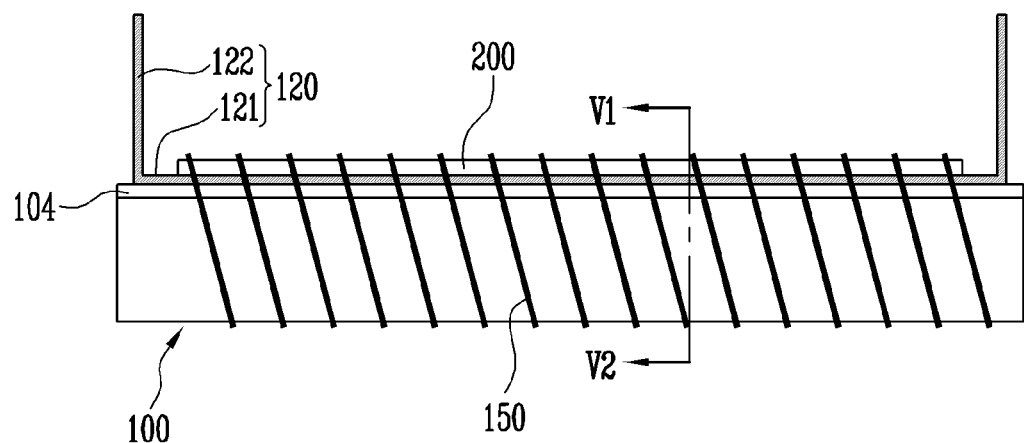
FIG. 3 is a schematic front view of an interconnecting-type unit cell having a current collecting structure according to an embodiment of the present disclosure.
Figure 4:
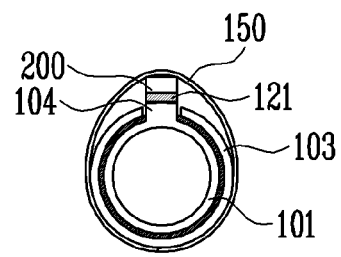
FIG. 4 is a side view showing the unit cell of FIG. 3.

An embodiment of an interconnecting-type unit cell having a winding-type current collecting structure will be described with reference to FIGS. 3 and 4. FIG. 3 is a schematic front view of an interconnecting-type unit cell having a current collecting structure according to an embodiment of the present disclosure. FIG. 4 is a side view showing the unit cell of FIG. 3. A first current collecting member 120 is divided into a first current collecting portion 121 and first connecting portions 122. The first current collecting portion 121 contacts an outside of an interconnector 104 and is configured to collect current. The first connecting portions 122 are formed to extend from both ends of the first current collecting portion 121. The first connecting portion 122 is a component for connecting the unit cell to other unit cells in series or in parallel, or a component for collecting current to the outside of the unit cell. Meanwhile, a first insulating member 200 is formed to contact an outside of the first current collecting portion 121 of the first current collecting member 120.

A second current collecting member 150 is wound around the outer circumferential surface of the unit cell 100 and the outside of the first insulating member 200. Therefore, the first insulating member 200 is interposed between the second current collecting member 150 and the first current collecting portion 121.

The second current collecting member 150 may be formed of a heat resistant alloy including iron (Fe) and at least one of chrome (Cr) and nickel (Ni). That is, the second current collecting member 150 may be formed using 400 series ferrite stainless steel, or other suitable material having excellent heat resistance rather than using silver wire (Ag wire). The second current collecting member 150 may be formed of a chrome-based alloy, which includes chrome (Cr), a ferrite-based Fe—Cr alloy, which includes iron (Fe), a nickel-based superalloy, which includes nickel (Ni), or the like. Among these alloys, the ferrite-based Fe—Cr alloy having excellent heat resistance based on characteristics of the fuel cell is preferably used as the second current collecting member 150. ZMG232 (City, State, Country) and Crofer22® (City, State, Country) may be used as representative ferrite-based Fe—Cr alloy. To improve the oxidation resistance of the second current collecting member 150, the second current collecting member 150 may be formed using Mn—Co spinel coating crofer, Mn—Co spinel coating stainless steel, etc., on which oxidation resistant coating is formed.

Figure 5:
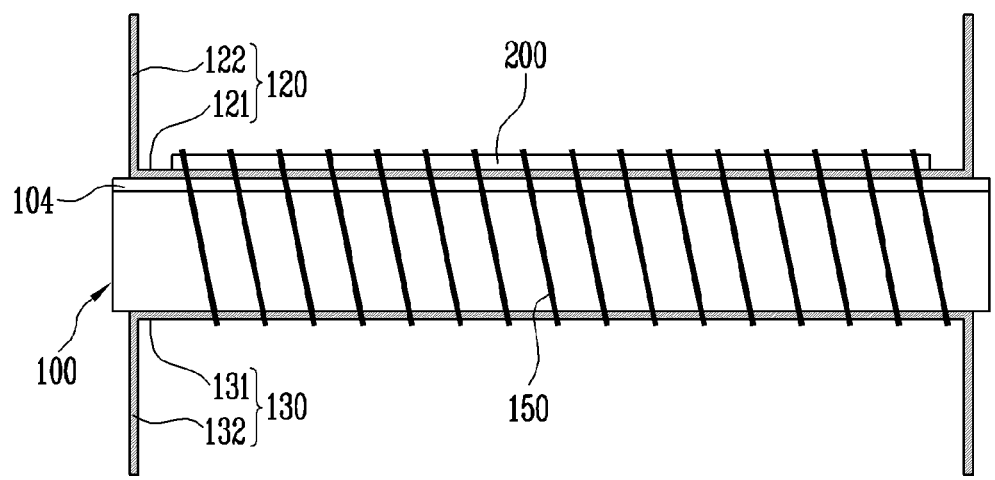
FIG. 5 is a schematic front view of an interconnecting-type unit cell having a current collecting structure according to another embodiment of the present disclosure.
Figure 6:
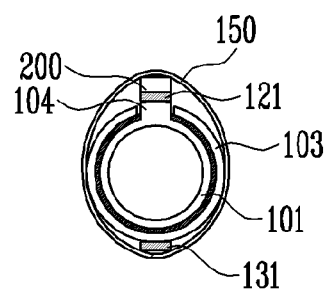
FIG. 6 is a side view showing the unit cell of FIG. 5.

Another embodiment of an interconnecting-type unit cell having a winding-type current collecting structure will be described with reference to FIGS. 5 and 6. FIG. 5 is a schematic front view of an interconnecting-type unit cell having a current collecting structure according to another embodiment of the present disclosure. FIG. 6 is a side view showing the unit cell of FIG. 5. The interconnecting-type unit cell 100 according to the embodiment of FIGS. 5 and 6 includes a third current collecting member 130. The third current collecting member 130 is divided into a third current collecting portion 131 and second connecting portions 132. The third current collecting portion 131 is interposed between the outer circumferential surface of the unit cell 100 and the second current collecting member 150 so as to collect current 150. The second connecting portions 132 are formed to extend from both ends of the third current collecting portion 131, respectively. The second connecting portion 132 is a component connected to a first or second connecting portion formed on another unit cell and configured to connect the unit cell 100 in series or parallel to the corresponding unit cell.

Figure 7:
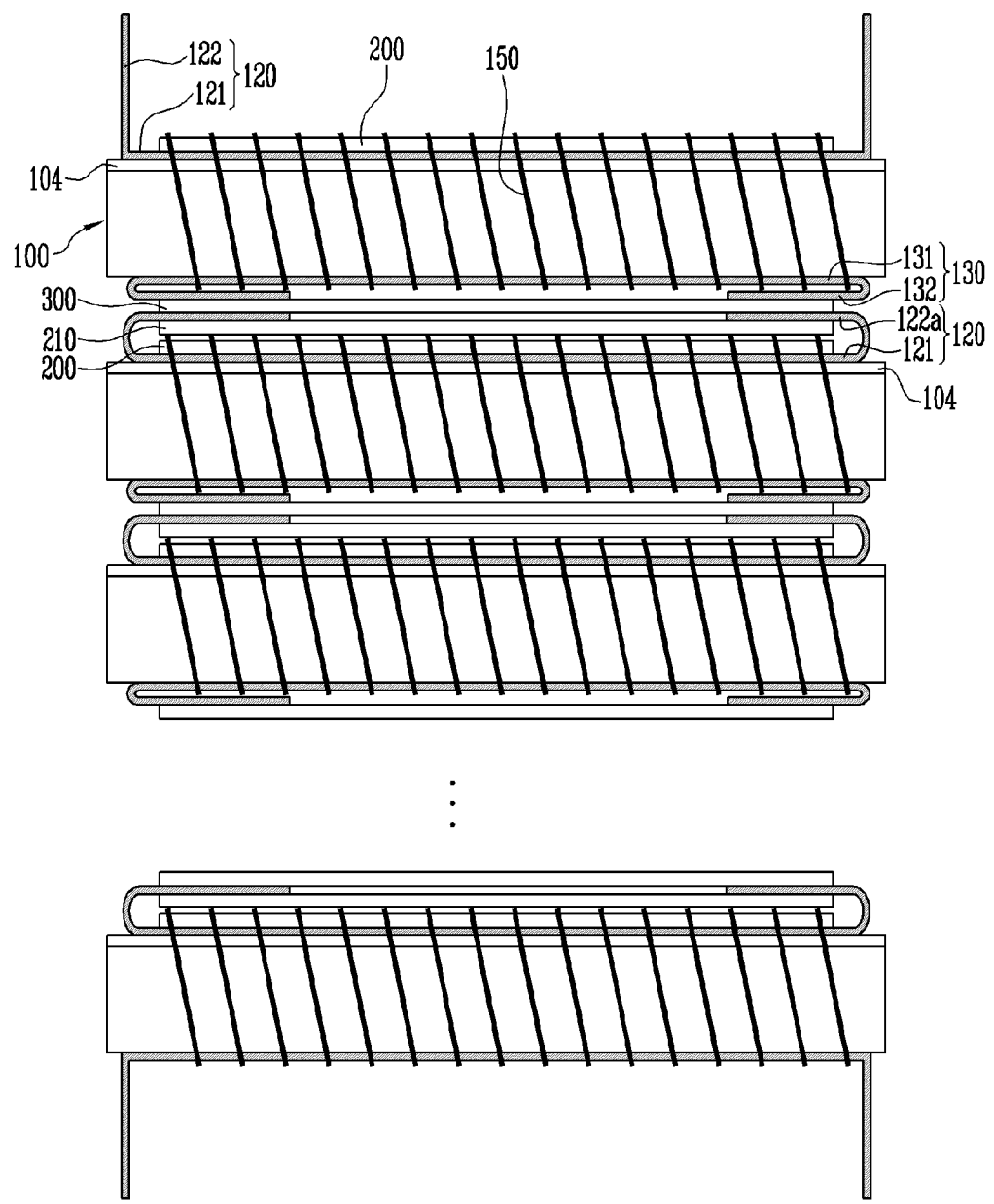
FIG. 7 is a front view showing a stack in which interconnecting-type unit cells are connected to one another according to an embodiment of the present disclosure.
Figure 8:
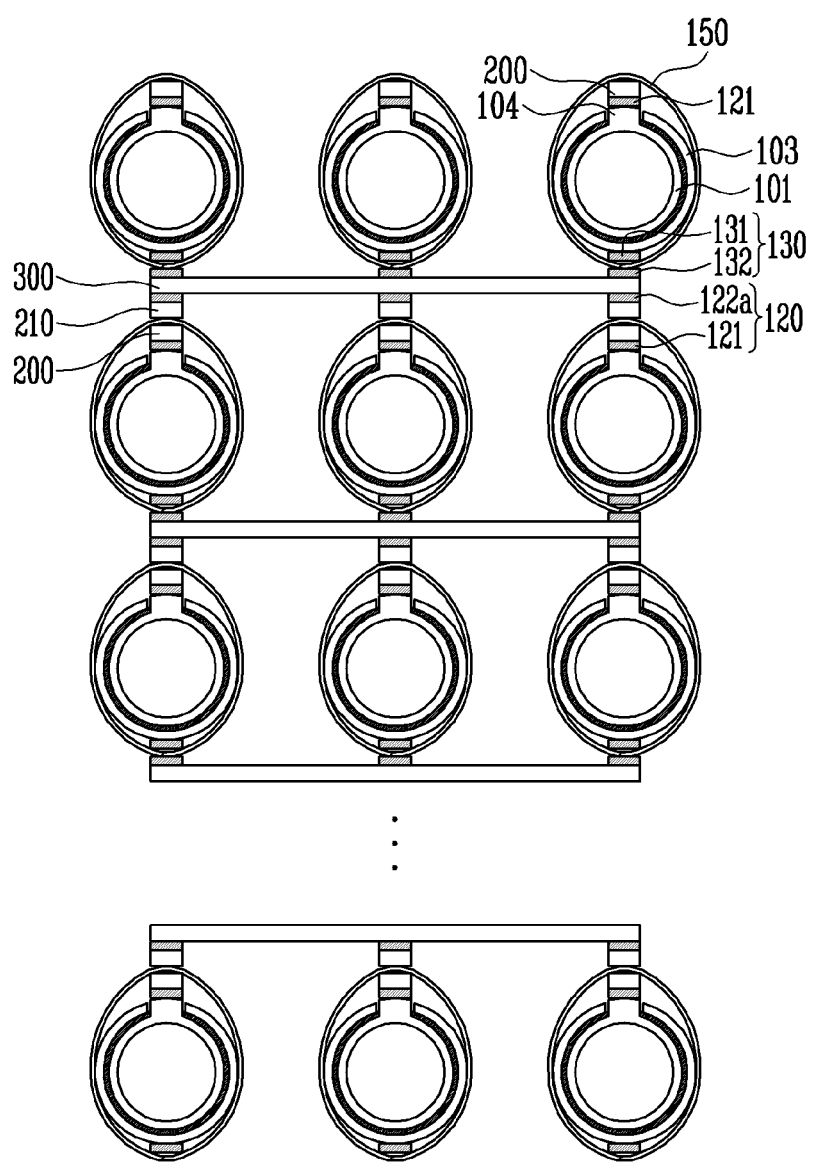
FIG. 8 is a side view showing the stack of FIG. 7.

An embodiment of a stack in which interconnecting-type unit cells are configured to be electrically connected to one another will be described with reference to FIGS. 7 and 8. FIG. 7 is a front view showing a stack in which interconnecting-type unit cells are connected to one another according to an embodiment of the present disclosure. FIG. 8 is a side view showing the stack of FIG. 7.

The stack according to this embodiment has a structure in which a plurality of unit cells and current collecting structures may be electrically connected to one another. The second connecting portions 132 of the third current collecting member 130 are bent to be parallel with the third current collecting portion 131 or to be closely parallel with the third current collecting portion 131. In this case, the second current collecting member 150 may be interposed between the third current collecting portion 131 and the second connecting portion 132. First connecting portions 122a of the first current collecting member 120 are bent to be parallel with the first current collecting portion 121 or to be closely parallel with the first current collecting portion 121. In this case, a second insulating member 210 for insulation is provided between the first connecting portion 122a and the second current collecting member 150.

The first connecting portion 122a and the second connecting portion 132 may be configured for electrical connection to each other. During operation, when a plurality of unit cells are electrically connected in parallel with one another as shown in FIG. 8, a connecting plate 300 may be provided between the first connecting portion 122a and the second connecting portion 132. The connecting plate 300 may be formed of silver (Ag) epoxy. The connecting plate 300 may function to adjust an interval between two adjacent unit cells or to advantageously maintain the shape of the stack. In this case, at least one mechanical coupling structure of a bolt and nut coupling structure and a rivet coupling structure may be formed between the first connecting portion 122a and the connecting plate 300 and between the connecting plate 300 and the second connecting portion 132.

Figure 9:
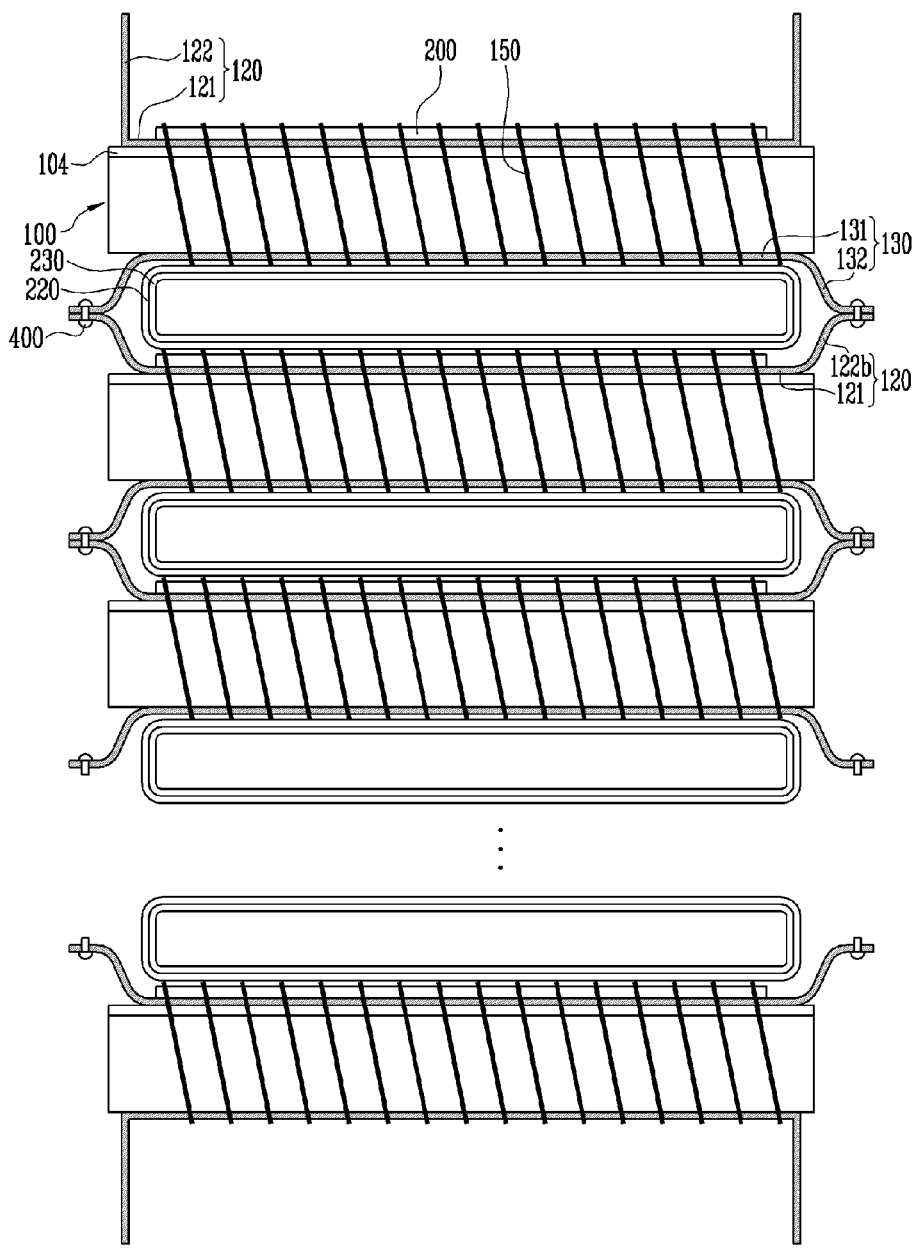
FIG. 9 is a front view showing a stack in which interconnecting-type unit cells are connected to one another according to another embodiment of the present disclosure.

Another embodiment of the stack in which interconnecting-type unit cells are configured for electrical connection to one another will be described with reference to FIG. 9. FIG. 9 is a front view showing a stack in which interconnecting-type unit cells are connected to one another according to another embodiment of the present disclosure.

In the embodiment of FIG. 9, a third insulating member 220 is provided between the second current collecting member 150 formed on any one of the plurality of unit cells 100 and the second current collecting member 150 formed on another unit cell adjacent to the corresponding unit cell. A support body 230 for maintaining an interval between both adjacent unit cells 100 and forming the shape of the third insulating member 220 may be formed on the inside of the third insulating member 220. The support body 230 may be formed of a metal material so as to maintain its shape under a high-temperature atmosphere. A first connecting portion 122b and the second connecting portion 132 may be electrically connected to each other. In this case, the first connecting portion 122b and the second connecting portion 132 may be connected to each other through a coupling member 400 such as a rivet.

Figure 10:
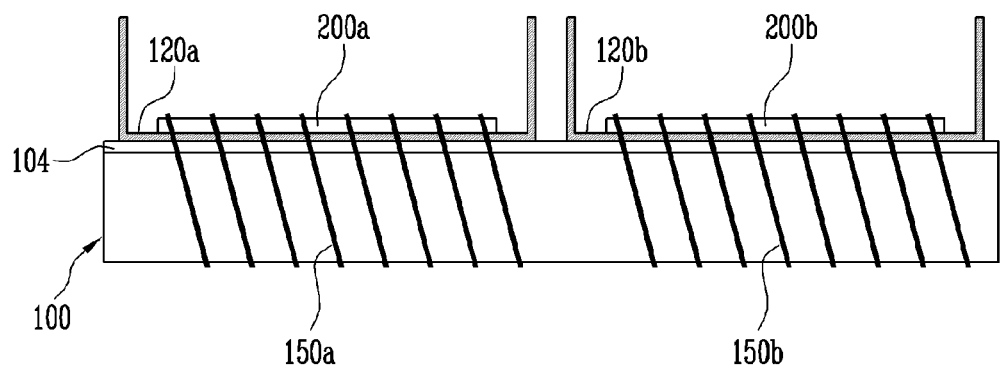
FIG. 10 is a schematic front view of an interconnecting-type unit cell having a current collecting structure according to still another embodiment of the present disclosure.
Figure 11:
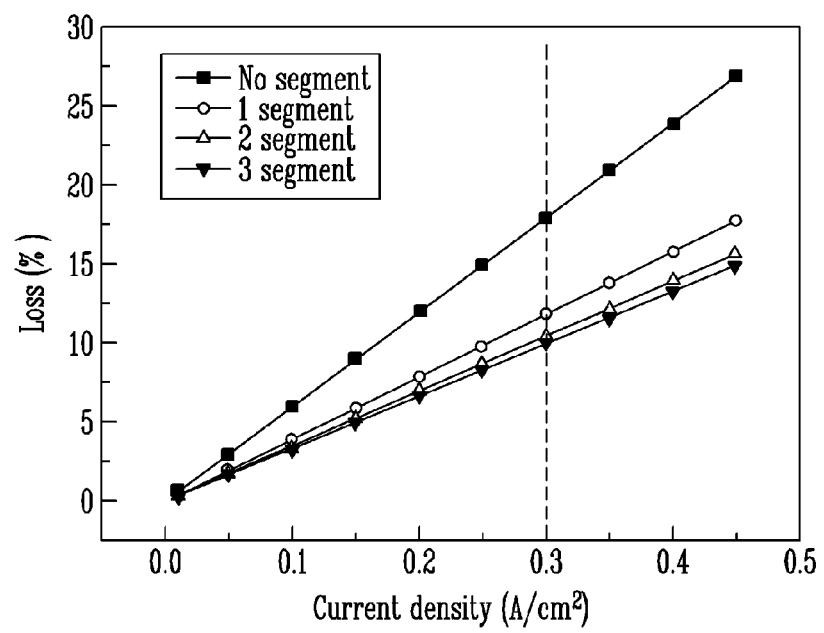
FIG. 11 is a graph comparing loss rates according to the number of segments.

An embodiment of an interconnecting-type unit cell in which a plurality of current collecting segments is formed will be described with reference to FIGS. 10 and 11. FIG. 10 is a schematic front view of an interconnecting-type unit cell having a current collecting structure according to still another embodiment of the present disclosure. FIG. 11 is a graph comparing loss rates according to the number of segments.

In the unit cell shown in FIGS. 3 and 4 or the unit cell shown in FIGS. 5 and 6, the current collecting structure may be separated into a plurality of segments along the length direction thereof. For example, as shown in FIG. 10, a first current collecting member 120a, a first insulating member 200a and a second current collecting member 150a are formed as one set, and may be provided as a plurality of sets along the length direction of a single unit cell.

Meanwhile, FIG. 11 is a graph showing a relationship between current density and loss according to the number of segments in a single unit cell. When comparing a case in which segment current collection is not used with a case in which the segment current collection is used as shown in FIG. 11, it can be seen that during operation of each of the embodiments the performance in the case in which the segment current collection is used is improved by 10% or more as compared with that in which the segment current collection is not used. In addition, it can be estimated from the result of the graph for the relationship between the current density and loss that the effect of the segment current collection is advantageous as the size of the unit cell becomes relatively large.

While the present invention has been described in connection with certain exemplary embodiments, it will be appreciated by those skilled in the art that various modifications and changes may be made without departing from the scope of the present disclosure. It should be understood that the exemplary embodiments described therein should be considered in a descriptive sense only and not for purposes of limitation. Descriptions of features or aspects within each embodiment should typically be considered as available for other similar features or aspects in other embodiments. Indeed, it will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. Thus, while the present disclosure has described certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An interconnecting-type solid oxide fuel cell, comprising:
   a unit cell having a first electrode layer, an electrolyte layer and a second electrode layer sequentially formed from an inside thereof, the unit cell further including an interconnector configured to be electrically connected to the first electrode layer and exposed to an outside thereof, the interconnector insulated from the second electrode layer;
   a first current collecting member formed on an outside of the interconnector and configured to collect current;

a first insulating member formed on an outside of the first current collecting member; and a second current collecting member wound around an outer circumferential surface of the second electrode layer and an outside of the first insulating member.

2. The solid oxide fuel cell of claim 1, wherein the unit cell is formed as an anode-supported unit cell in which the first electrode layer is an anode and the second electrode layer is a cathode.

3. The solid oxide fuel cell of claim 2, wherein a conductive mesh member is formed on an outer circumferential surface of the second electrode layer.

4. The solid oxide fuel cell of claim 1, wherein the second current collecting member is formed of a heat resistant alloy including iron (Fe) and at least one of chrome (Cr) and nickel (Ni).

5. The solid oxide fuel cell of claim 1, further comprising a third current collecting member interposed between the outer circumferential surface of the second electrode layer and the second current collecting member and configured to collect current.

6. The solid oxide fuel cell of claim 5, wherein a radially extending first connecting portion is formed at each end of the first current collecting member.

7. The solid oxide fuel cell of claim 6, wherein a radially extending second connecting portion is formed at each end of the third current collecting member.

8. The solid oxide fuel cell of claim 1, wherein the first current collecting member, the first insulating member, and the second current collecting member are formed as a plurality of sets along the length direction of a single unit cell.

9. An interconnecting-type solid oxide fuel cell stack, comprising:

a plurality of unit cells each having a first electrode layer, an electrolyte layer and a second electrode layer sequentially formed from an inside thereof, each unit cell further having an interconnector configured to be electrically connected to the first electrode layer and exposed to an outside thereof, the interconnector insulated from the second electrode layer;

a first current collecting member formed on an outside of the interconnector and configured to collect current, wherein a radially extending first connecting portion is formed at each end of the first current collecting member;

a first insulating member formed on an outside of the first current collecting member;

a second current collecting member wound around an outer circumferential surface of the second electrode layer and an outside of the first insulating member; and a third current collecting member interposed between the outer circumferential surface of the second electrode layer and the second current collecting member and configured to collect current, wherein a radially extending second connecting portion is formed at each end of the third current collecting member, wherein the first and second connecting portions are bent to be parallel with the first and third current collecting members, respectively, and the first and second connecting portions are configured to be electrically connected to each other.

10. The solid oxide fuel cell stack of claim 9, wherein a second insulating member is interposed between the first connecting portion and the first current collecting member.

11. The solid oxide fuel cell stack of claim 9, wherein a connecting plate is interposed between the first and second connecting portions.

12. The solid oxide fuel cell stack of claim 11, wherein the connecting plate is formed of Ag epoxy.

13. The solid oxide fuel cell stack of claim 11, wherein at least one mechanical coupling structure selected from the group consisting of a bolt and nut coupling structure, and a rivet coupling structure is formed between the first connecting portion and the connecting plate and between the connecting plate and the second connecting portion.

14. The solid oxide fuel cell stack of claim 11, wherein a plurality of second connecting portions are configured to be electrically connected to one surface of the connecting plate, and a plurality of first connecting portions are configured to be electrically connected to the other surface of the connecting plate.

15. An interconnecting-type solid oxide fuel cell stack, comprising:

a plurality of unit cells each having a first electrode layer, an electrolyte layer and a second electrode layer sequentially formed from an inside thereof, and each having an interconnector configured to be electrically connected to the first electrode layer and exposed to an outside thereof, the interconnector insulated from the second electrode layer;

a first current collecting member formed on an outside of the interconnector and configured to collect current, wherein a radially extending first connecting portion is formed at both ends of the first current collecting member;

a first insulating member formed on an outside of the first current collecting member;

a second current collecting member wound around an outer circumferential surface of the second electrode layer and an outside of the first insulating member; and a third current collecting member interposed between the outer circumferential surface of the second electrode layer and the second current collecting member, the third current collecting member configured to collect current, wherein a radially extending second connecting portion is formed at both ends of the third current collecting member, wherein a third insulating member is formed between the second current collecting member formed on any one of the plurality of unit cells and the second current collecting member formed on another unit cell adjacent to the one unit cell, and wherein the first and second connecting portions are configured to be electrically connected to each other.

16. The solid oxide fuel cell stack of claim 15, wherein a support body is formed and configured for maintaining an interval between both adjacent second current collecting members and maintaining the shape of the third insulating member is formed on the inside of the third insulating member.

17. The solid oxide fuel cell stack of claim 16, wherein the support body is formed of a metal material.

* * * * *